Aug. 18, 1964   L. E. ROBINSON ET AL   3,145,006
COLLAPSIBLE TRAILER SUPPORT AND ANCHOR
Original Filed May 23, 1956   6 Sheets-Sheet 1

LESTER E. ROBINSON
GEORGE K. BRADFIELD JR.
JOHN A. JOHNSON
*INVENTORS*

BY

*Robert A. Shield*

ATTORNEY

Aug. 18, 1964　　　L. E. ROBINSON ETAL　　　3,145,006
COLLAPSIBLE TRAILER SUPPORT AND ANCHOR
Original Filed May 23, 1956　　　　　　　　　6 Sheets-Sheet 2
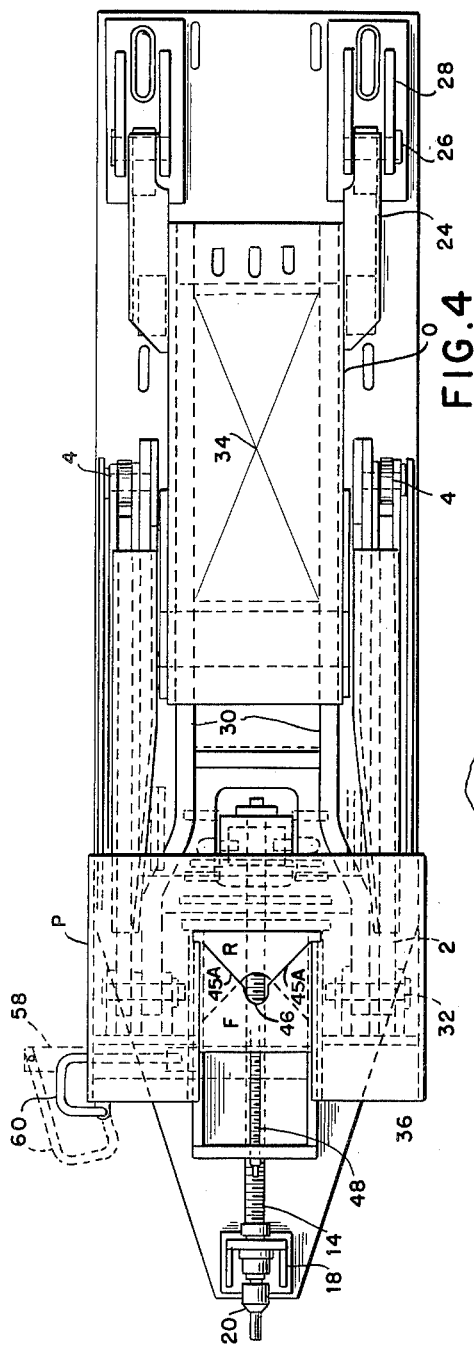
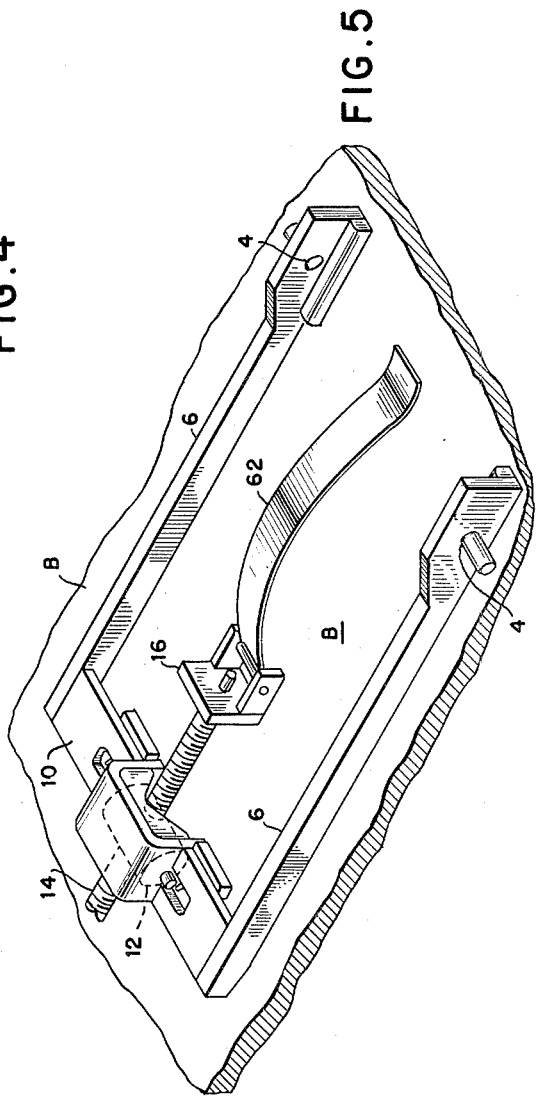
LESTER E. ROBINSON
GEORGE K. BRADFIELD JR.
JOHN A. JOHNSON
*INVENTORS*
BY
*Robert A. Shield*
ATTORNEY Aug. 18, 1964 L. E. ROBINSON ETAL 3,145,006
COLLAPSIBLE TRAILER SUPPORT AND ANCHOR
Original Filed May 23, 1956 6 Sheets-Sheet 3

LESTER E. ROBINSON
GEORGE K. BRADFIELD JR.
JOHN A. JOHNSON
*INVENTORS*

BY
Robert A. Shields
ATTORNEY

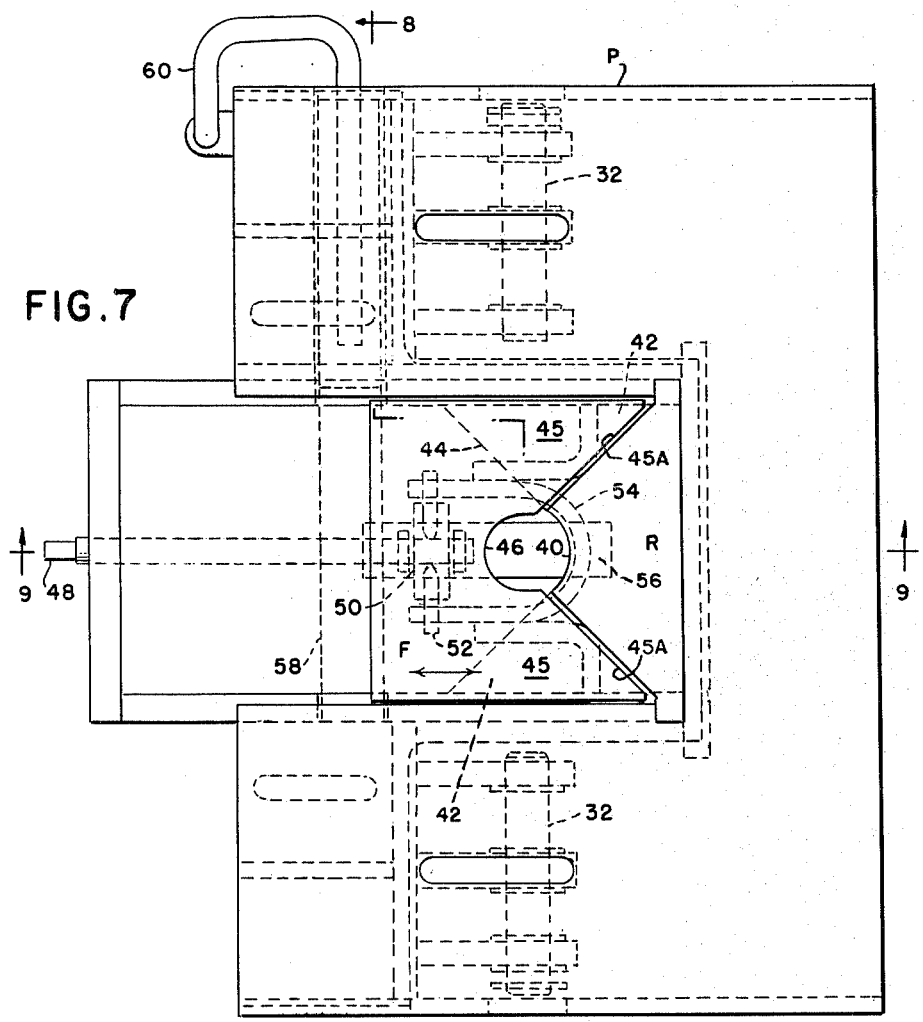
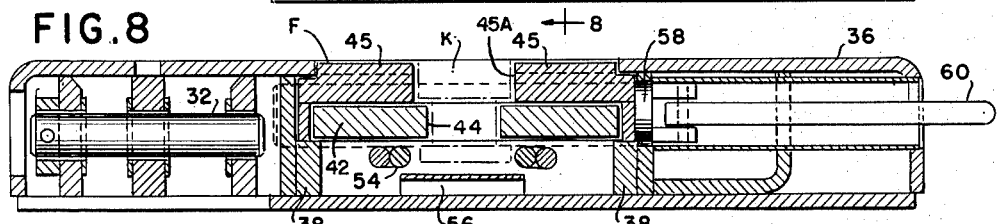
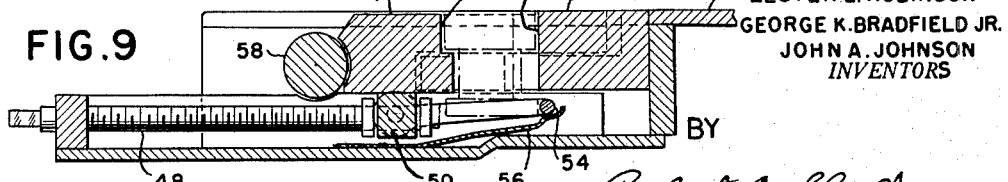

Aug. 18, 1964    L. E. ROBINSON ETAL    3,145,006
COLLAPSIBLE TRAILER SUPPORT AND ANCHOR
Original Filed May 23, 1956    6 Sheets-Sheet 5

LESTER E. ROBINSON
GEORGE K. BRADFIELD JR.
JOHN A. JOHNSON
INVENTORS

BY Robert A. Shields
ATTORNEY

Aug. 18, 1964    L. E. ROBINSON ETAL    3,145,006
COLLAPSIBLE TRAILER SUPPORT AND ANCHOR
Original Filed May 23, 1956    6 Sheets-Sheet 6
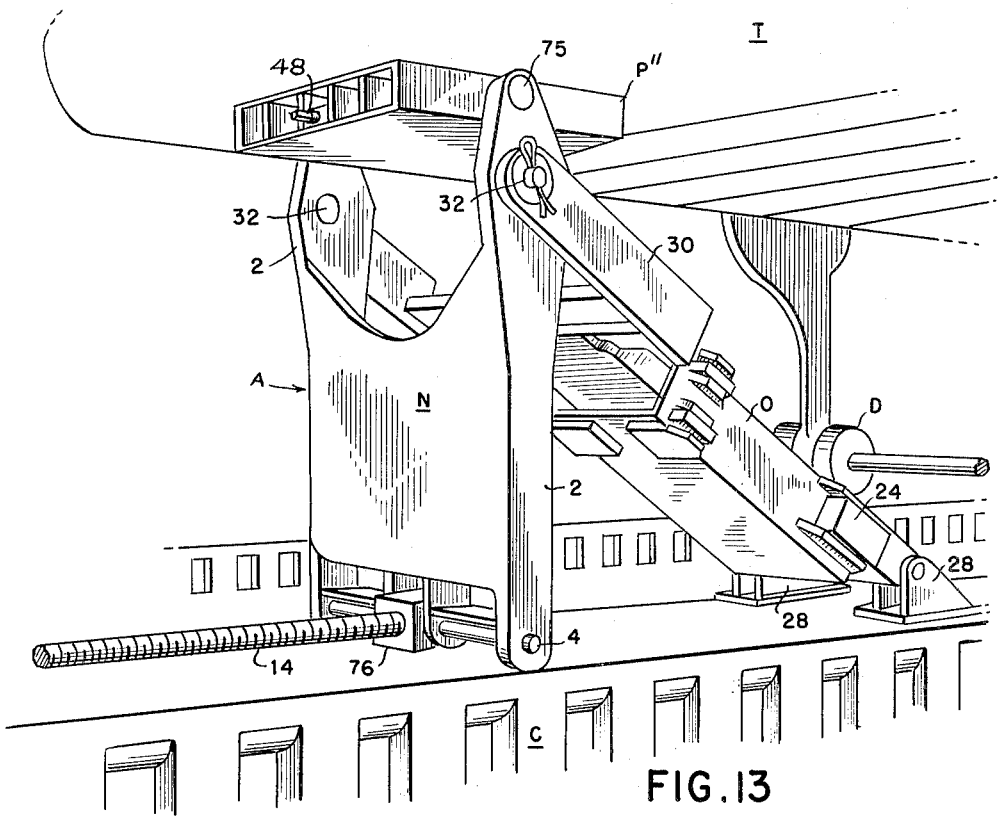
FIG.13
FIG.14
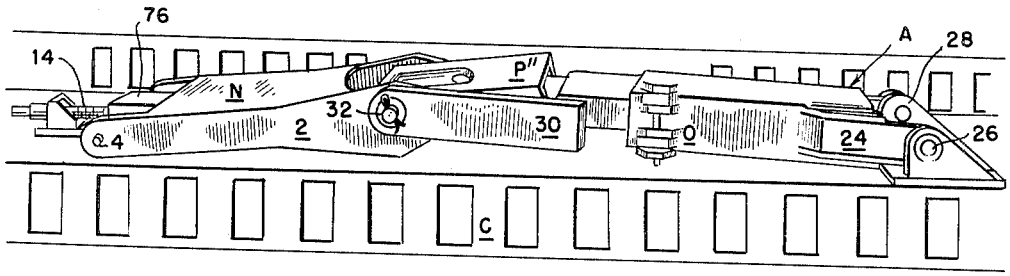
LESTER E. ROBINSON
GEORGE K. BRADFIELD JR
JOHN A. JOHNSON
*INVENTORS*
BY
*Robert A. Shields*
ATTORNEY 3,145,006
COLLAPSIBLE TRAILER SUPPORT AND ANCHOR
Lester E. Robinson, Short Hills, George K. Bradfield, Jr., Maywood, and John A. Johnson, Short Hills, N.J., assignors of two-thirds to ACF Industries, Incorporated, New York, N.Y., a corporation of New Jersey, and one-third to The Rail Trailer Co., Chicago, Ill., a corporation of Delaware
Continuation of application Ser. No. 586,835, May 23, 1956. This application June 9, 1959, Ser. No. 819,192
10 Claims. (Cl. 248—119)

This invention relates generally to a support and anchor for highway trailers but in particular to supports and anchors of the collapsible and resilient controlled type. This application is a continuation of our previous application Serial No. 586,835, filed May 23, 1956, now abandoned.

Highway trailers have been transported on railway cars, ships and other structure by rigidly anchoring the trailer to the supporting structure in attempts to prevent any movement of the trailer underframe or road supporting wheels. With this type of support and anchor the lading carried by the trailer may shift under impact or shock and damage the trailer super-structure. Previous structures frequently required side loading of the trailers which is both slow and costly, both in time and terminal facilities. Accordingly, an object of the present invention is the provision of a support and anchor device which can be driven over by the tractor and trailer without any interference, yet which can be quickly operated to a raised position by a single operator after the trailer is approximately positioned.

A further object of the invention is the provision of a support and anchor for the forward end of a highway trailer resting on its road wheels and which support permits resiliently controlled movement of the trailer upon its road wheels.

A still further object of the invention is the provision of a support and anchor device which can be power raised from a lowered to a raised position lifting the forward end of the trailer off of its temporary supporting dolly wheels.

A yet further object of the invention is the provision of a collapsible trailer support and anchor having a positive lock for engaging the trailer king-pin which lock includes gathering or trailer moving features permitting locking of the trailer without necessity of extremely accurate spotting of the trailer with respect to the support and anchor device by the tractor. The support and anchoring device performing the function of perfectly spotting an imperfectly spotted trailer, and then securing it.

These and other objects of the invention will be apparent from a study of the following description and accompanying drawings in which:

FIG. 4 is a plan view of the device of FIG. 3.

FIG. 5 is a partial perspective of the operating means to raise the device.

FIG. 7 is an enlarged plan view of the trailer supporting platform and anchor.

FIG. 8 is a sectional view taken substantially on line 8—8 of FIG. 7.

FIG. 9 is a sectional view taken substantially on line 9—9 of FIG. 8.

FIG. 13 is a perspective view of a modification of the preferred device of FIG. 2, and FIG. 14 is a perspective view of the device of FIG. 13 when in the collapsed or folded position.

Figure 1:
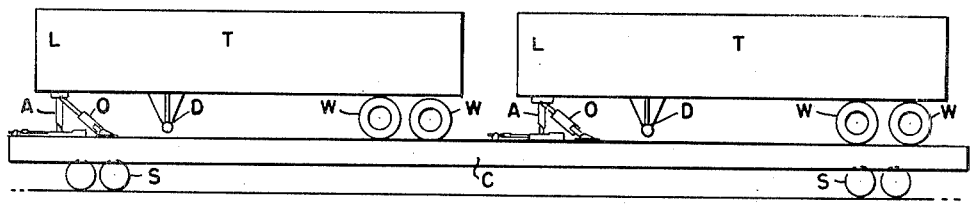
FIGURE 1 is a diagrammatic elevational view of a railway car carrying two trailers anchored in place by the improved anchoring device.

Referring now to the drawings in detail it will be seen from FIG. 1 that a pair of trailers T have their road wheels W resting upon and supported by the floor of a supporting structure such as railway car C which in turn is carried upon its rail wheels S. The forward end L of each trailer is supported upon the collapsible device or mast A which will raise the dolly wheels D out of contact with the supporting structure upon which the trailer is supported.

As clearly shown, the support and anchoring device is formed with a first leg or member N, a second leg or member O and a trailer supporting platform and lock device P, the device being movably mounted with respect to a base B which may be the car floor or other supporting structure or may be a base adapted to be attached to the car floor or other supporting structure.

The leg or member N when in the raised position is substantially vertical and is formed either as a trussed weldment or as a casting having side pieces 2, the lower ends of which are pierced as to receive a pivot pin 4. This pivot pin extends, in the form of FIGS. 1–6 inclusive, through the ends of slide bars 6 comprising a yoke slidably mounted on the base and held in place by inner and outer guide members 7 and 8, respectively. The ends of slide pieces 6 remote from pins 4 are joined by cross piece 10 in which is mounted a nut 12, this nut engaging a threaded shaft 14 having its one end rotatably carried in bracket 16 mounted on the base or floor B and its other end rotatably carried in a bracket 18 also fixed to the floor or base member B. The end of the shaft 14 adjacent bracket 18 is provided with an end 20 adapted to receive a power wrench (not shown). Operation of the screw 14 will, of course, move nut 12 therealong together with connected slides 6 and pivot pins 4.

Figure 2:
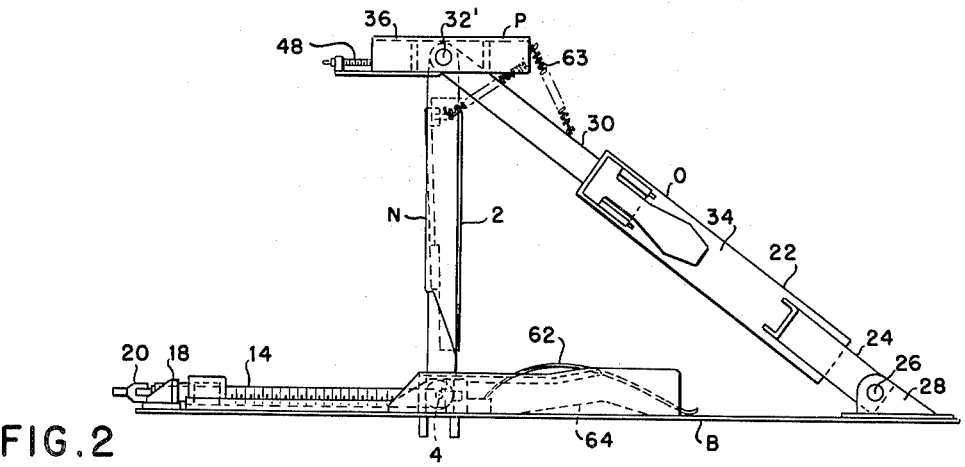
FIG. 2 is a side elevational view of a preferred anchoring device in the raised position.

The second leg or member O is also movably mounted with respect to the base or floor B at one end and is pivotally connected at the remote end to the end of leg or member N as clearly shown in FIG. 2. The member O is preferably made in two parts of either weldments or castings and the lower part 22 is provided with arms 24 joined by pivot pins 26 to brackets 28 welded or otherwise secured to the base or floor B. The top or second part 30 of the leg or member O has its upper ends spread and pivotally connected to leg N by pivot pins 32. The lower end of upper member 30 extends into the upper end of lower member 22 and is joined to the lower member by a resilient device 34 (shown merely by X line in FIG. 4) and which resilient device operates to resist both inward and outward movement of the top member 30 with respect to the lower member 22. In other words, the resilient device can absorb shocks in either direction and in a resilient manner.

Figure 6:
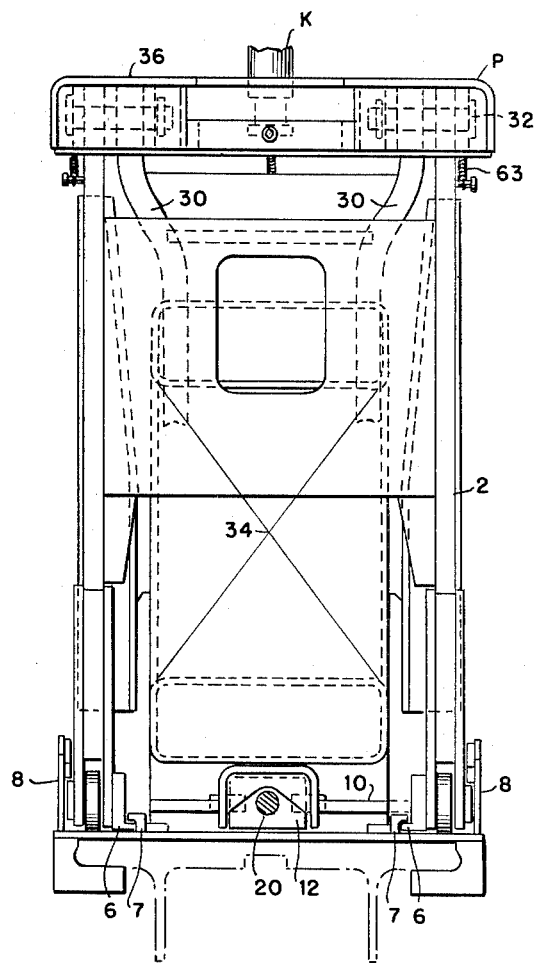
FIG. 6 is a front end elevational view of the device.

As clearly shown in FIGS. 2, 4 and 6 pivot pins 32 also support pivotally the trailer supporting platform P. The trailer supporting platform P is of generally box formation having a flat top surface 36 adapted to be lubricated and engage the under surface of the elevated forward supporting plate of the trailer. This box like platform is suitably trussed and braced to receive the loads imparted thereto and is provided centrally with guides 38 to which may be welded or otherwise secured a fixed block or lock member R having a king-pin receiving substantially semi-cylindrical surface 40 formed in the forward vertical surface thereof. This fixed king-pin receiving block has forwardly extending wings 42 having vertical king-pin guiding surfaces 44 extending laterally and longitudinally outwardly from surface 40, the wings 42 providing a support for similar wings 45 carried by the movable block or lock member F and overlapping the wings 42 in the closed position of the blocks F, R, illustrated in FIGURES 4 and 7. Wings 45 have the vertical king pin guiding surfaces 45A extending laterally and longitudinally outwardly from surface 46. The member F is also provided with a king-pin receiving substantially semi cylindrical vertical surface 46. These surfaces 40 and 46 are shaped to conform to the trailer king-pin K shown in FIGS. 6 and 8 and together form a securing socket therefor. Surfaces 44 and 45A extend longitudinally and laterally outwardly from the surfaces 40, 46. In order to move the movable jaw or block F a screw thread shaft 48 is provided rotatably mounted at its ends in platform P and engaging a nut 50. This nut 50 is attached to the movable block F so that rotation of the screw will move block F directly away from and towards surface 40. Also, nut 50 is provided with projecting pins 52 upon which are pivotally mounted the ends of a U-shaped yoke 54 adapted to engage the lower end of king-pin K and move the king-pin with the movable block F. Thus, in moving the movable block F to an unlocked position the yoke 54 will, through the king-pin, pull the entire trailer resting upon its road wheels forward so that the fixed block R will clear the king-pin upon lowering of the supporting platform through the power operating end 20. Likewise, the movable block F will shift the trailer rearwardly in case the trailer has been imperfectly spotted. In order that loop 54 will be raised and conditioned for an unlocking operation a spring member 56 is provided as shown in FIGS. 8 and 9. While the shaft 48 will have self-locking threads it is desirable to positively lock the movable block F against accidental displacement and this is done by means of a lock bar 58 slidably carried in the platform and operated by means of a locking handle 60 which may be sealed to the platform.

Figure 3:
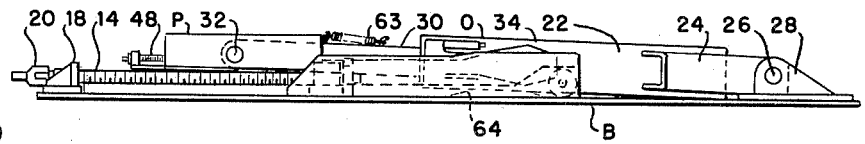
FIG. 3 is a side elevational view of the device in a collapsed position.

In operation and assuming that the support and locking device is in the collapsed position shown in FIG. 3 the trailer will be backed over the collapsed device until the king-pin K is in approximately the correct position, then the tractor will be uncoupled with the trailer resting on its dolly wheels D. An operator will then attach either a hand or power wrench to the end 20 of screw 14. Rotation of this screw in the proper direction will pull the slides 6 toward bracket 18 imparting a thrust on the lower end of leg N through pins 4. To assist in starting the lifting movement a spring 62, best shown in FIG. 5, is provided which is compressed when the device is in its lowered position of FIG. 3. Continued rotation of operating shaft 14 will bring the leg N to a substantially vertical position and the two part resilient leg O to a diagonal position with the platform P being held in a substantially horizontal position by balancing springs 63. With the supporting device in this position, rotation of screw shaft 48 will cause movement of forward block F toward the rear and will shift the entire trailer on its road wheels to a position where the trailer king-pin is firmly engaged by surfaces 40 and 46 and in overlapping relation to the enlarged lower end of the king-pin K. With the trailer in this position the dolly wheels D will be clear of the supporting floor or base B and any shocks imparted to the supporting structure such as C will allow the trailer to move longitudinally upon its road wheels W. This movement of the trailer will cause vertical leg N to oscillate, lowering or raising platform P. The oscillations are under positive control of the resilient device 34 carried in the two part leg O. It will be seen that as the platform is lowered by rocking or oscillation of end L of the trailer the resilient device 34 will be compressed, but in returning the parts to their normal position the resilient device 34 will have to lift the forward end of the trailer thus serving to dampen the return of the resilient device 34 to its normal position. The resilient device will, of course, be prestressed to eliminate all slack and to normally hold the leg N in a substantially vertical position with the intended trailer load supported on platform P.

It will also be noted, particularly in connection with FIGS. 2 and 3, that a small cam surface 64 is provided intermediate the down and raised position so that leg N will rise at a more nearly constant rate and will give greater lifting power to lift the trailer off of its dolly wheels during movement to the fully raised position.

Figure 10:
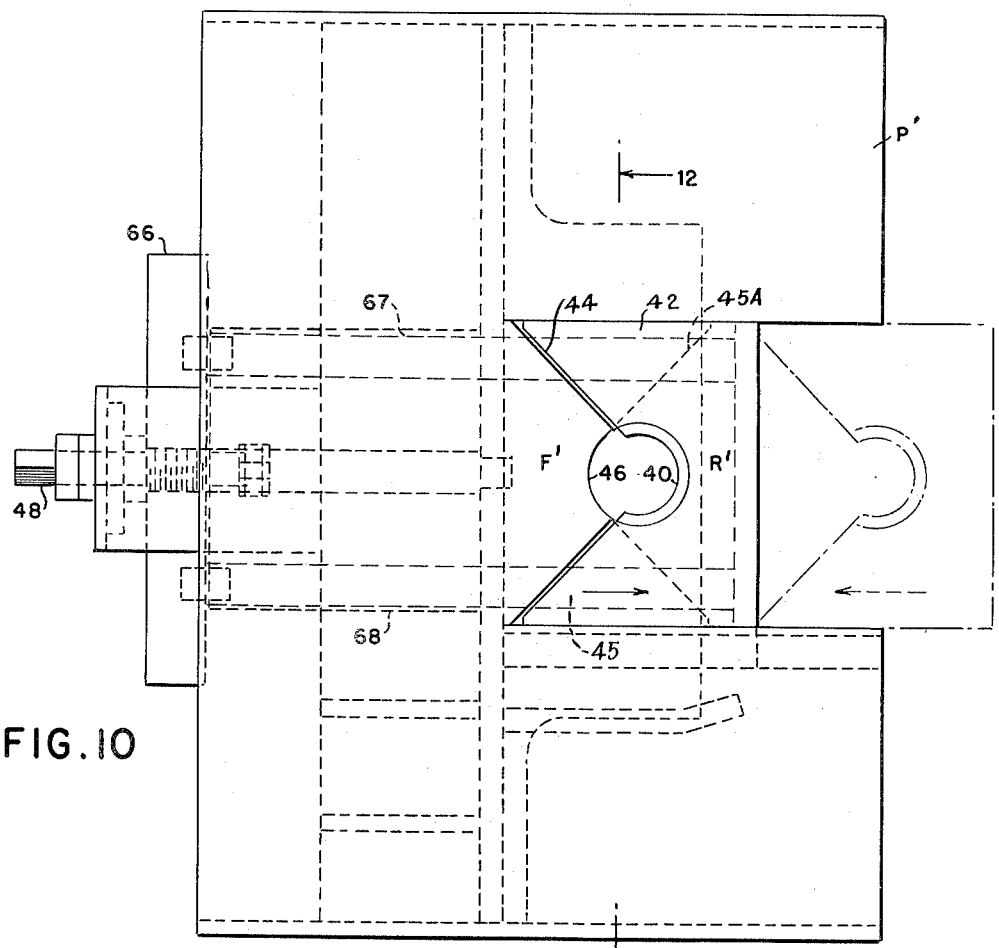
FIG. 10 is a plan view similar to FIG. 7 but showing a slight modification of the locking means for the trailer supporting platform.
Figure 11:
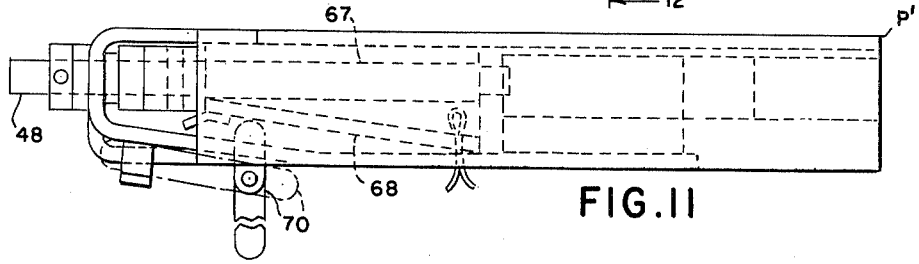
FIG. 11 is a side view of the platform of FIG. 10.
Figure 12:
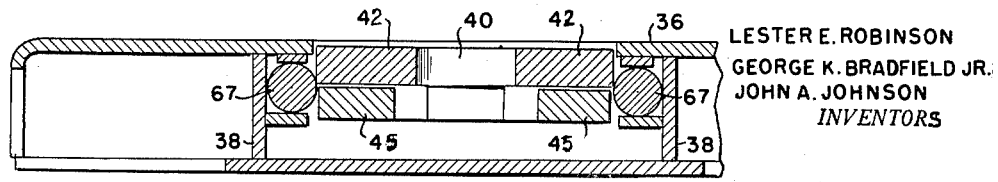
FIG. 12 is a sectional view taken substantially on line 12—12 of FIG. 10.

Referring now to the modification shown in FIGS. 10, 11 and 12 it will be seen that shifting loop 54 can be eliminated by reversing the relative location of the fixed and movable blocks. The platform P' is substantially the same as platform P previously referred to but the fixed block F' of the lock is in the forward position while the movable block R' is in the rearward position. The blocks are of the same general construction as that previously described in connection with FIGS. 7, 8 and 9 and the same reference numerals suitably modified have been applied.

In the form shown in FIGS. 10, 11 and 12 the operating screw 48 carries a yoke 66 to which is attached push rods 67 extending through the trussed frame of platform P' and being secured to the rear movable block R'. Rotation of the screw 48 will cause the yoke 66 to shift toward the rear with respect to the trailer and move the movable block R' from the closed full line position to the dotted line position of FIG. 10. In this case the block R' will of itself pull the entire trailer forward when being moved from the dotted position to the full line position and when the movable block R' is moved from the full to the dotted line position in unlocking the trailer it is not necessary to shift the trailer as in the form shown in FIGS. 7, 8 and 9 due to the fact that during lowering of the mast or supports the fixed forward block F' will move away from the king-pin K instead of toward the king-pin as is the case with the fixed block R in the form shown in FIGS. 7, 8 and 9. In order to lock the yoke 66 against any possible movement a pair of bars 68 may be loosely pinned to the platform and raised or lowered under control of an operating lock shaft 70. In the raised position as shown in FIG. 11, the bars 68 block any possible movement of yoke 66 in an unlocking direction.

The two forms of platform P, P' illustrated in FIGURES 1–12 thus comprise king pin engaging and securing means which can encompass the king pin of an imperfectly spotted trailer and forcefully actuate the trailer through the king pin to perfectly spotted position, in which position the king pin is moreover secured in the king pin securing socket of the platform.

In the modified form as shown in FIGS. 13 and 14 the upper ends of two part resilient member O are connected by the same type of pivotal pins 32 to the upper ends of arms 2 of leg member N, but in this form the leg members 2 extend beyond pivots 32 to a pivotal connection 75 with platform P" which may be either of the type shown in FIGS. 7, 8 and 9 or that shown in FIGS. 10, 11 and 12. In order to operate the leg or support member N, the pins 4 are extended to engage a nut 76 mounted on the operating screw 14 having its ends journalled in brackets in the same manner as that previously described in connection with FIG. 2. In this form however, rotation of the screw 14 causes the lower end of leg N to move away from the lower end of leg O to the collapsed position shown in FIG. 14. In other words the operating means of FIGS. 13 and 14 move the lower ends of legs N away from brackets 28 whereas in the form of FIGS. 2 and 3 the lower ends of leg N move toward the brackets 28 during collapsing.

While the device has been described particularly with reference to its mounting on a railway car it is obvious that the device can be either directly mounted on the floor of a transport structure such as a railway car or ship or it may be mounted on a base plate which in turn may be secured to any supporting structure such as a railway car or ship. In any case the trailer can move longitudinally on its road wheels to absorb shock but under control of the resilient device carried in the diagonal strut and controlling the oscillations of the upper end of the vertical strut or leg.

While the invention has been described more or less in detail it will be obvious to persons skilled in the art that various modifications and forms other than those shown may be made without departing from the scope of the following claims defining our invention.

What is claimed is:

1. A support and anchor device for supporting a highway trailer and anchoring the trailer to a railway car, said device comprising a supporting structure including a first leg member substantially vertically disposed when in operative position, a second leg member inclined at an angle relative to said first leg member when in operative position, said leg members being pivotally connected adjacent their upper portions, a platform pivotally supported by said leg members, means adapted for pivotally mounting the lower portions of said leg members on the car, means for moving the lower portion of one of said leg members relative to the lower portion of said other leg member for raising and lowering the upper portions of said leg members to raise and lower said platform between a collapsed lowered inoperative position permitting longitudinal movement of the highway trailer thereover and an operative raised position for supporting one end of the highway trailer, means on said platform adapted to engage the trailer when said platform is in its raised operative position to secure the trailer to the platform, and cushioning means in said second leg member for providing cushioning action of the trailer on the car when said platform is in its raised operative position.

2. A support and anchor device for supporting a highway trailer having a kingpin and anchoring the trailer to a railway car, said device comprising a supporting structure including a first leg member substantially vertically disposed when in operative position, a second leg member inclined at an angle relative to said first leg member when in operative position, said leg members being pivotally connected adjacent their upper portions, a platform pivotally supported by said leg members, means adapted for pivotally mounting the lower portions of said leg members on the car, means for moving the lower portion of one of said leg members relative to the lower portion of said other leg member for raising and lowering the upper portions of said leg members to raise and lower said platform between a collapsed lowered inoperative position permitting longitudinal movement of the highway trailer thereover and an operative raised position for supporting one end of the highway trailer, latch means on said platform adapted to engage the trailer kingpin when said platform is in its raised operative position to secure the trailer to the platform, and cushioning means in said second leg member for providing cushioning action of the trailer on the car when said platform is in its raised operative position.

3. A support and anchor device for supporting a highway trailer having a kingpin and anchoring the trailer to a railway car, said device comprising a supporting structure including a first leg member disposed uprightly when in operative position, a second leg member inclined at an angle relative to said first leg member when in operative position, said leg members being pivotally connected adjacent their upper portions, a platform pivotally supported by said leg members, means adapted for pivotally mounting the lower portions of said leg members on the car, means for moving one of said leg members angularly in relation to the other of said leg members for raising and lowering the upper portions of said leg members to raise and lower said platform between a collapsed lowered inoperative position permitting longitudinal movement of the highway trailer thereover and an operative raised position supporting one end of the highway trailer, latch means on said platform adapted to engage the trailer kingpin when said platform is in its raised operative position to secure the trailer to the platform, and cushioning means in said second leg member for providing cushioning action of the trailer on the car when said platform is in operative raised position.

4. A support and anchor device for supporting a highway trailer and anchoring the trailer to a railway car, said device comprising a supporting structure including a first leg member substantially vertically disposed when in operative position, a second leg member inclined at an angle relative to said first leg member when in operative position, said leg members being pivotally connected adjacent their upper portions, a platform pivotally supported by said leg members, means adapted for pivotally mounting the lower portions of said leg members on the car, means for moving the lower portion of said first leg member relative to the lower portion of said second leg member for raising and lowering the upper portions of said leg members to raise and lower said platform between a collapsed lowered inoperative position permitting longitudinal movement of the highway trailer thereover and an operative raised position supporting one end of the highway trailer, means on said platform adapted to engage the trailer when said platform is in its raised operative position to secure the trailer to the platform, and cushioning means in said second leg member for providing cushioning action of the trailer on the car when said platform is in operative raised position.

5. A support and anchor device for supporting a highway trailer having a kingpin and anchoring the trailer to a railway car, said device comprising a supporting structure including a first leg member substantially vertically disposed when in operative position, a second leg member inclined at an angle relative to said first leg member when in operative position, said leg members being pivotally connected adjacent their upper portions, a platform pivotally supported by said leg members, means adapted for pivotally mounting the lower portions of said leg members on the car, means for moving the lower portion of said first leg member relative to the lower portion of said second leg member for raising and lowering the upper portions of said leg members to raise and lower said platform between a collapsed lowered inoperative position permitting longitudinal movement of the highway trailer thereover and an operative raised position supporting one end of the highway trailer, latch means on said platform adapted to engage the trailer kingpin when said platform is in its raised operative position to secure the trailer to the platform, and cushioning means in said second leg member for providing cushioning action of the trailer on the car when said platform is in operative raised position.

6. A support and anchor device for supporting a highway trailer having a kingpin and anchoring the trailer to a railway car, said device comprising a supporting structure including a first leg member disposed uprightly when in operative position, a second leg member inclined at an angle relative to said first leg member when in operative position, said leg members being pivotally connected adjacent their upper portions, a platform pivotally supported by said leg members, means adapted for pivotally mounting the lower portions of said leg members on the car, means for moving the lower portion of said first leg member angularly in relation to the lower portion of said second leg member for raising and lowering the upper portions of said leg members to raise and lower said platform between a collapsed lowered inoperative position permitting longitudinal movement of the highway trailer thereover and an operative raised position supporting one end of the highway trailer, latch means on said platform adapted to engage the trailer kingpin when said platform is in its raised operative position to secure the trailer to the platform, and cushioning means in said second leg member for providing cushioning action of the trailer on the car when said platform is in operative raised position.

7. A support and anchor device for supporting a highway trailer having a kingpin and anchoring the trailer to a railway car, said device comprising a supporting structure including a first leg member substantially vertically disposed when in operative position, a second leg member inclined at an angle relative to said first leg member when in operative position, said leg members being pivotally connected adjacent their upper portions, a platform pivotally supported by said leg members, means adapted for pivotally mounting the lower portions of said leg members on the car, means for moving the lower portion of one of said leg members relative to the lower portion of said other leg member for raising and lowering the upper portions of said leg members to raise and lower said platform between a collapsed lowered inoperative position permitting longitudinal movement of the highway trailer thereover and an operative raised position for supporting one end of the highway trailer, latch means on said platform adapted to engage the trailer kingpin when said platform is in its raised operative position to secure the trailer to the platform, cushioning means in said second leg member for providing cushioning action of the trailer on the car when said platform is in its raised operative position, and resilient means mounted adjacent one of said leg members, said resilient means being adapted to be compressed when the leg members are in their lowered position and normally urging said platform toward its raised operative position.

8. A support and anchor device for supporting a highway trailer and anchoring the trailer to a railway car, said device comprising a supporting structure including a first leg member substantially vertically disposed when in operative position, a second leg member inclined at an angle relative to said first leg member when in operative position, said leg members being pivotally connected adjacent their upper portions, a platform pivotally supported by said leg members, means adapted for pivotally mounting the lower portions of said leg members on the car, operating means including a connection for an external power source for moving the lower portion of one of said leg members relative to the lower portion of said other leg member for raising the upper portions of said leg members to raise said platform between a collapsed lowered inoperative position permitting longitudinal movement of the highway trailer thereover and an operative raised position for supporting one end of the highway trailer, means on said platform adapted to engage the trailer when said platform is in its raised operative position to secure the trailer to the platform, and cushioning means in said second leg member for providing cushioning action of the trailer on the car when said platform is in its raised operative position.

9. The structure of claim 8 wherein the operating means includes a screw extending between the lower portions of said leg members.

10. A support and anchor device for supporting a highway trailer and anchoring the trailer to a railway car, said device comprising a supporting structure including a first leg member substantially vertically disposed when in operative position, a second leg member inclined at an angle relative to said first leg member when in operative position, said leg members being pivotally connected adjacent their upper portions, a platform pivotally supported by said leg members, means adapted for pivotally mounting the lower portions of said leg members on the car, means for moving the lower portion of one of said leg members relative to the lower portion of said other leg member for raising and lowering the upper portions of said leg members to raise and lower said platform between a collapsed lowered inoperative position permitting longitudinal movement of the highway trailer thereover and an operative raised position for supporting one end of the highway trailer, means for maintaining said platform in a substantially horizontal position when said platform is in its raised operative position, means on said platform adapted to engage the trailer when said platform is in its raised operative position to secure the trailer to the platform, and cushioning means in said second leg member for providing cushioning action of the trailer on the car when said platform is in its raised operative position.

References Cited in the file of this patent

UNITED STATES PATENTS

| 1,136,176 | Shadbolt | Apr. 20, 1915 |
| 2,031,256 | Dorsey | Feb. 18, 1936 |
| 2,036,344 | Menhall | Apr. 7, 1936 |
| 2,036,535 | Nelson | Apr. 7, 1936 |
| 2,093,761 | Kramer | Sept. 21, 1937 |
| 2,099,288 | Allen | Nov. 16, 1937 |
| 2,196,537 | Sherman | Apr. 9, 1940 |
| 2,705,634 | Sampson et al. | Apr. 5, 1955 |
| 2,835,209 | Kavanaugh | May 20, 1958 |
| 2,880,681 | Markestein et al. | Apr. 7, 1959 |

FOREIGN PATENTS

| 1,175,682 | France | Nov. 17, 1958 |